United States Patent [19]
Diaz-De-Guerenu-Aguirrebeitia

[11] Patent Number: 4,799,406
[45] Date of Patent: Jan. 24, 1989

[54] APPARATUS FOR STRIPPING ELECTRICAL WIRES AND THE LIKE

[76] Inventor: Pablo Diaz-De-Guerenu-Aguirrebeitia, Po martutene s/n C. Iru-Lagunak, San Sebastian, Spain

[21] Appl. No.: 66,855

[22] Filed: Jun. 25, 1987

[30] Foreign Application Priority Data

Jun. 25, 1986 [ES] Spain .............................. 295.257[U]

[51] Int. Cl.⁴ .............................................. H02G 1/12
[52] U.S. Cl. ........................................ 81/9.4; 30/90.1; 30/90.6
[58] Field of Search ............... 30/90.1, 90.6, 90.7, 30/90.8, 91.1, 91.2; 81/9.4, 9.44

[56] References Cited

U.S. PATENT DOCUMENTS

| | | | |
|---|---|---|---|
| 2,704,000 | 3/1955 | Miller | 30/90.6 |
| 2,778,255 | 1/1957 | Miller | 30/90.6 |
| 2,795,982 | 6/1957 | Mathias | 30/91.2 |
| 3,914,864 | 10/1975 | Prince | 30/90.6 |
| 4,070,930 | 1/1978 | Oprins | 30/90.6 |

Primary Examiner—Roscoe V. Parker
Attorney, Agent, or Firm—Lucas & Just

[57] ABSTRACT

An improved device for stripping electrical and similar wires is disclosed. A main body and an arm are articulated at one end of each. The main body includes cutting blades at the top of arcuate openings. The cable to be stripped is clamped between the articulated members so that the cutting blade cuts the sheath to be removed from the electric cable but does not cut the underlying conductor. Additional features include capability of longitudinal cutting of the sheathing, controlled graduation means for precise control of the depth of cut, and a cooperating recess and projection arrangement for easy removal of the cut sheath.

10 Claims, 2 Drawing Sheets

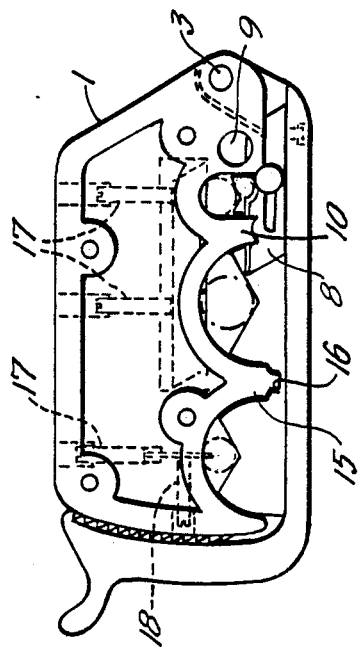
FIG. 4.
FIG. 3.
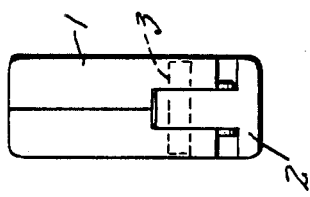
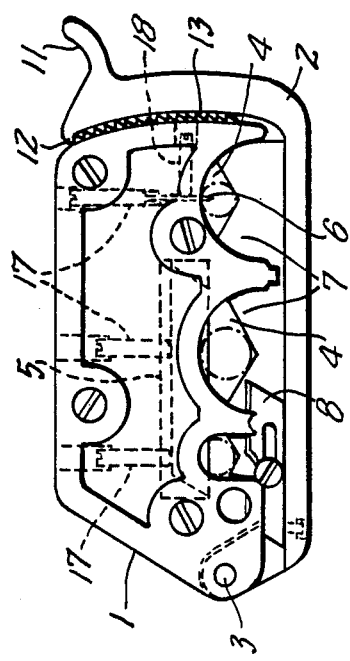
FIG. 2.
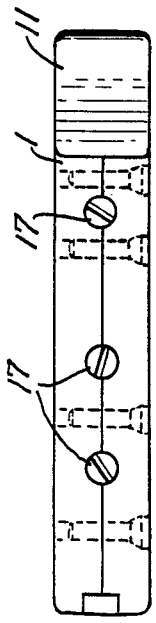
FIG. 5.

APPARATUS FOR STRIPPING ELECTRICAL WIRES AND THE LIKE

One of the tasks most often performed by electricians and persons engaged in wiring installation, manufacture or repair of electrical equipment is stripping insulation from wires so that the metal core may be connected to an electric fitting or appliance.

For this manual task, the tool most used is the conventional electrician's clipper, which, when used with skill, can strip wire of small diameter with comparative efficiency. Depending on the skill and experience of the person performing the operation, however it nearly always entails the unintentional severing of one or more conductor filaments, and hence a loss of effective cross section for carrying an electric current or signal.

When it comes to stripping armored, waterproof or coaxial cables of some thickness, the conventional clippers are used with difficulty, especially on the outer sheathing, and very often inner cables are cut in a hardly perceptible manner, thus giving rise to short circuits and similar problems.

The object of the present invention is to solve the above mentioned problem, and to provide a perfect cut for cables of any type. There is herein disclosed an improved device for stripping electric cables and the like, consisting of a main body and an arm articulated thereto, both made of synthetic material, comprising a combination of various matched recesses and cutting blades disposed therein so that when the cable is placed in the said recesses and the tool is rotated, a longitudinal and/or encircling circumferential cut of the insulation results to the desired depth, precisely to separate it from the protective sheathing without at all damaging the conductive metal core.

So that the proposed tool may function with full effectiveness for a wide range of cable diameters, the main body provides places of different diameters and the articulated arm may approach the body more or less closely, thus defining a wide range of openings, the intermediate positions being fixed with the aid of teeth in the main body, to be engaged by an appendage of the toothed, elastically deformable articulated arm, which moreover bears a scale indicating the proper size of the diameter to be cut in that position.

As previously mentioned, besides the circumferential cutting blades suitable for ordinary stripping, the device according to the invention comprises, in the main body, a knife set perpendicular to the others and serving to make lengthwise cuts in cables of the desired length with surprising simplicity and efficacy, a feature which greatly simplifies the stripping of waterproof, coaxial and similar cables with heavy outside protective sheathing.

Between placements of successive blades, provision has been made for a conjugate shape between the body and the arm, enabling them to grip any type of cable firmly as in a clamp, so that when the sheath has been cut, it will be separated from the inner core, the said clamp being stepped in such a way that it will serve fully for a wide range of diameters.

It has further been provided that, in addition to the main body, the articulated arm likewise carries some cutting blades located near the pivot, for stripping or severing cables of small diameter at that point; these blades may be single or double, serving in the latter case when set at different cutting depths, for the simultaneous outer and inner stripping of shielded cables, for example such as those used in antennas and for signal transmission.

The cutting blades, in a preferred embodiment, are secured to the body or the arm by means of screws so that they may be readily replaced. In addition, there are other screws in relation to these for modifying the setting, either to make cuts of greater or less depth or else to shift their positions with a view to uniform wear along the edge.

As may be seen from what has been said so far, the subject of the invention affords a versatility and simplicity in use that distinguish it from anything known to date in this field, which, together with other advantages such as adjustability, a clean cut without affecting the conductive element, etc., render this design a thing totally novel and having a vitality of its own.

FIG. 2 shows an elevation of the device, with alternate positions of cables to be stripped indicated by dot-dash lines.

FIG. 3 shows an end view of the cable stripping device in the hinge area.

FIG. 4 shows an elevation of the design, illustrating one of the two knives (8) mounted on the arm (2).

FIG. 5 shows a top view of the proposed device, indicating the knife adjusting screws (17).

Figure 1:
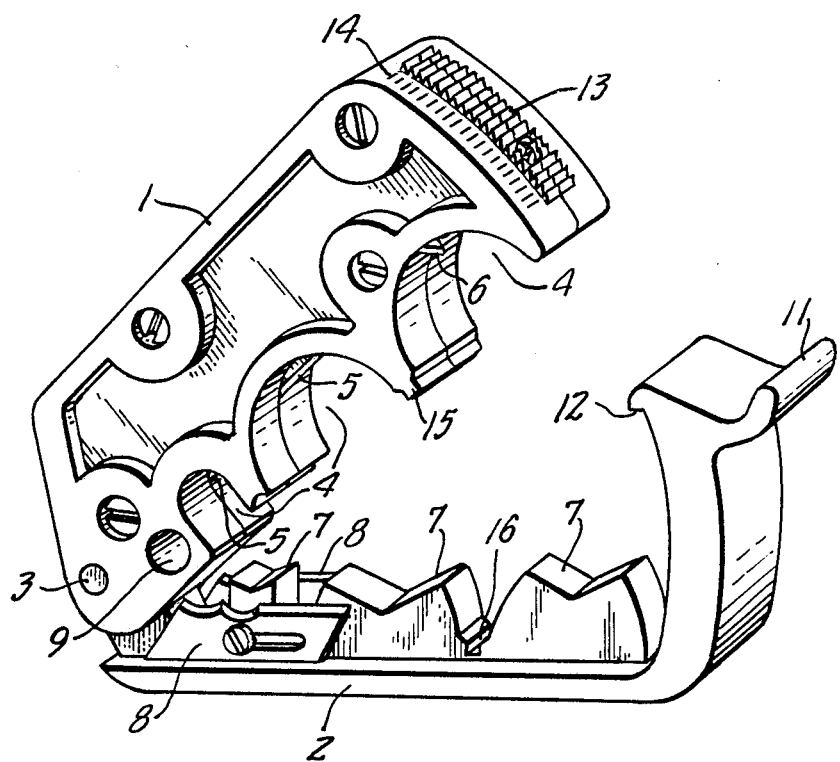
FIG. 1 shows a perspective view of the device according to the invention to open position.

Illustrative Details 1. body
2. arm
3. articulation
4. bows
5. transverse knives
6. lengthwise knife
7. pads
8. knife
9. opening
10. wedge
11. rest
12. retaining engagement
13. teeth
14. indicating scale
15. tongue
16. groove
17. adjusting screws
18. fixation screws This invention relates to an improved device for stripping electric cables and the like, consisting, as may be seen in FIG. 1, of a body (1) made by joining two like parts of synthetic material, joined at one end by means of an articulation (3) in the form of a pivot to an arm (2), constituting an assembly like a pair of jaws to be actuated with one hand, provision having been made that for this purpose at least the arm (2) affords an anatomical configuration for a convenient grip by providing some depressions for the fingers.

The body (1) has, on the inside, a series of curved openings (4) of different diameters, in which are centrally placed, projecting slightly, some mutually perpendicular knives (5 and 6). In addition, in a complementary position to these openings, there are some supports (7) made in one piece with the arm (2) of the same synthetic material. All this is so that, as may be seen in FIG. 2, when a cable is placed between the opening (4) and the support (7) corresponding to its diameter, the circumferential sectioning of its sheath by the knife (5) transverse to the cable may be brought about by rotating the device around the cable; or alternatively, the axial sectioning of said insulating piece by the longitudinal knife (6), by sliding the device along the cable.

The cut may be adapted to the diameter of the cable and to the thickness of its insulating layer firstly by a controlled closing of the body (1) and the arm (2), such closing being perfectly graduated and accurate by virtue of the presence, on an appendage to the arm (2), of a retaining engagement (12), see FIG. 2, catching resiliently on teeth (13) in the body (1), together with a scale (14) indicating precisely the ideal depth of cut for each type of cable. The engagement (12) is released by pressure on a rest (11) anatomically suited to the hand, thus permitting quick operation of the whole assembly.

Furthermore, this adaptation may be selectively regulated by the user by adjusting the knives (5 and 6), for which purpose, as may be seen in FIGS. 2 and 4, the knives (5 and 6) have adjusting screws (17) bearing on their inner edges, by means of which the depth of cut may be regulated with great precision, so that the inner conductor or cable will never be damaged. In addition, see FIG. 4, the knife (6) has a set screw (18) holding it securely.

On the arm (2) there is also at least one knife (8), see FIG. 4, which is displaceable lengthwise to achieve uniform wear, permitting both stripping and clipping of wires of small diameter. This function is performed by the combination of the said knife (8) with an opening (9) strategically located to cut only the insulating sheath, with a wedge (10) providing support for the entire section of the cable. It should be noted that the knife (8) may be double, arranged on either side of the arm (2) and at different heights of cut, so that by rotating the device, several cable sections may be stripped in one operation. This is convenient for coaxial cables, as for example the shielded cables used in antennas and signal transmission systems.

Provision has been made that between two consecutive openings (4), the body (1) forms a tongue (15) which is aligned with a groove (16), see FIG. 4, so that between the two there is a jaw capable of firmly gripping the ready-cut sheathing of the cable, regardless of its diameter, thus permitting its simple and effective separation with a sharp twist.

Provision has been made for a curved knife like a hook to protrude to the outside on one of the shorter sides of the device, for executing cuts along cables in situations such as for example when the cables have already been laid against a wall.

It will be understood that this application is intended to cover all modifications and changes of the preferred embodiments of the invention herein chosen for illustration which do not constitute a departure from the spirit and scope of the invention.

I claim:

1. Improved apparatus for stripping electric cables and the like, characterized by consisting of a main body bearing several cutting blades arranged substantially perpendicular to the body and protruding from several recesses formed by arcs of different radii in the body, corresponding supporting shapes extending from an arm articulated to said main body, the combination of the two permitting the lengthwise and crosswise stripping of cables, said articulated arm, at its end near the zone of articulation, defining a mounting zone for other knives which, corresponding to an opening in the main body, permit the final stripping of the inner conductors of the cable; said knives being capable of engaging a support of said main body provided with a suitable seat area to cut off said inner conductors.

2. Improved device for stripping electric cables and the like, according to claim 1, characterized by the knives disposed in the articulated arm being adjustable in longitudinal position for progressive utilization of said knives as they may become worn or nicked.

3. Improved device for stripping electric cables and the like according to claim 2, characterized in that the articulated arm, at its free end opposed to the pivot of the articulation, defines a support for the finger or fingers of the user, in order to facilitate freeing if from a retaining engagement established between this end of the arm and teeth on the main body of the device.

4. Improved device for stripping electric cables and the like, according to claim 1, characterized by graduations enabling the user to define and select the best position of the engagement of said articulated arm according to the size of the diameter of the cable to be stripped.

5. Improved device for stripping electric cables and the like, according to claim 1, characterized by at least one recess in the articulated arm and a corresponding projection in the main body, which can enter the recess to form a clamp capable of acting upon the cable, thus facilitating removal of the sheath or wrapping of the cable.

6. Improved device for stripping electric cables and the like, according to claim 1, characterized by the main body being formed of two half-bodies of synthetic material, joined together to secure the various cutting blades, and further having positional adjusting screws for securing the blades.

7. Improved device for stripping electric cables and the like, according to claim 3, characterized by the finger support having an anatomical conformation.

8. Improved device for stripping electric cables and the like, according to claim 1, wherein said main body consists of a one-piece body with the cutting blades incorporated therein.

9. Improved device for stripping electric cables and the like, according to claim 4, characterized by the said graduations being on that portion of the main body which is engaged by the articulated arm.

10. Improved device for stripping electric cables and the like, according to claim 1, characterized by the opening in the main body being of circular configuration.

* * * * *